(12) United States Patent
Valiensi et al.

(10) Patent No.: US 11,895,140 B2
(45) Date of Patent: *Feb. 6, 2024

(54) SYSTEMS AND METHODS FOR AUTOMATED PENETRATION TESTING

(71) Applicant: State Farm Mutual Automobile Insurance Company, Bloomington, IL (US)

(72) Inventors: Nicholas Valiensi, Mesa, AZ (US); Austin Engelmann, Mesa, AZ (US); Dave Dohrmann, Mesa, AZ (US); Jeremy Samiec, Phoenix, AZ (US); Ryan Ang, Tempe, AZ (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/580,415

(22) Filed: Jan. 20, 2022

(65) Prior Publication Data

US 2022/0150272 A1 May 12, 2022

Related U.S. Application Data

(63) Continuation of application No. 16/403,818, filed on May 6, 2019, now Pat. No. 11,252,172.

(60) Provisional application No. 62/669,770, filed on May 10, 2018.

(51) Int. Cl.
*H04L 9/40* (2022.01)
*G06F 16/2455* (2019.01)
*G06F 16/23* (2019.01)
*G06F 16/953* (2019.01)

(52) U.S. Cl.
CPC ...... *H04L 63/1433* (2013.01); *G06F 16/2379* (2019.01); *G06F 16/2455* (2019.01); *G06F 16/953* (2019.01)

(58) Field of Classification Search
CPC ............. H04L 63/1433; G06F 16/2379; G06F 16/953; G06F 16/2455
See application file for complete search history.

(56) References Cited

U.S. PATENT DOCUMENTS

| | | | |
|---|---|---|---|
| 7,325,252 B2 | 1/2008 | Bunker, V et al. | |
| 7,904,962 B1 | 3/2011 | Jajodia et al. | |
| 8,356,353 B2 | 1/2013 | Futoransky et al. | |
| 9,246,932 B2 | 1/2016 | Gorny et al. | |
| 10,268,824 B2 | 4/2019 | Jayaraman et al. | |
| 10,628,764 B1 * | 4/2020 | Kaplan | G06Q 10/063112 |
| 10,673,887 B2 * | 6/2020 | Crabtree | G06F 11/3495 |

(Continued)

OTHER PUBLICATIONS

ISSA Journal. Jun. 2017. vol. 15. Issue 6.
ISSA Journal. Apr. 2017. vol. 15. Issue 4.

*Primary Examiner* — Stephen T Gundry
(74) *Attorney, Agent, or Firm* — Armstrong Teasdale LLP

(57) ABSTRACT

A system for analyzing computer systems and networks for potential vulnerabilities to cyber-attacks configured to (i) receive scan data from a scan of a target computer device; (ii) search for one or more vulnerabilities based on the scan data; (iii) determine at least one attack vector based on the one or more vulnerabilities; (iv) generate one or more exploits based on the one or more attack vectors and the one or more vulnerabilities; and (v) execute the one or more exploits on the target computer device.

20 Claims, 7 Drawing Sheets

(56) References Cited

U.S. PATENT DOCUMENTS

| | | | |
|---|---|---|---|
| 10,679,164 B2* | 6/2020 | Irimie | G06Q 10/0635 |
| 10,812,527 B2* | 10/2020 | Irimie | H04L 67/535 |
| 2001/0034847 A1* | 10/2001 | Gaul, Jr. | H04L 63/1433 |
| | | | 709/225 |
| 2008/0263671 A1 | 10/2008 | Solino Testa et al. | |
| 2011/0030057 A1* | 2/2011 | Chen | H04L 63/1416 |
| | | | 726/25 |
| 2011/0035803 A1 | 2/2011 | Lucangeli Obes et al. | |
| 2011/0093954 A1* | 4/2011 | Lee | H04L 63/1433 |
| | | | 709/224 |
| 2013/0031037 A1 | 1/2013 | Brandt et al. | |
| 2013/0174263 A1 | 7/2013 | Nunez Di Croce | |
| 2014/0082735 A1 | 3/2014 | Beskrovny et al. | |
| 2014/0137257 A1 | 5/2014 | Martinez et al. | |
| 2016/0205122 A1 | 7/2016 | Bassett | |
| 2017/0104780 A1 | 4/2017 | Zaffarano et al. | |
| 2018/0007077 A1 | 1/2018 | Boia et al. | |
| 2018/0103054 A1 | 4/2018 | Cran et al. | |
| 2018/0124072 A1* | 5/2018 | Hamdi | G06F 11/3428 |
| 2018/0146004 A1 | 5/2018 | Belfiore, Jr. et al. | |
| 2018/0270268 A1 | 9/2018 | Gorodissky et al. | |
| 2018/0365429 A1 | 12/2018 | Segal | |
| 2019/0007447 A1* | 1/2019 | Barnes | H04L 63/306 |
| 2019/0014141 A1 | 1/2019 | Segal et al. | |
| 2019/0081974 A1 | 3/2019 | Lasser | |
| 2019/0149572 A1* | 5/2019 | Gorodissky | H04L 63/1475 |
| | | | 726/25 |
| 2019/0171984 A1* | 6/2019 | Irimie | G06Q 10/0635 |
| 2019/0173915 A1* | 6/2019 | Irimie | H04L 63/1433 |
| 2019/0173918 A1* | 6/2019 | Sites | G06N 3/044 |
| 2019/0173919 A1 | 6/2019 | Irimie et al. | |
| 2019/0238583 A1* | 8/2019 | Vaidya | G06F 30/20 |
| 2019/0245883 A1* | 8/2019 | Gorodissky | H04L 63/1433 |
| 2020/0296137 A1 | 9/2020 | Crabtree et al. | |
| 2020/0351298 A1* | 11/2020 | Paturi | G06N 5/04 |
| 2020/0356663 A1* | 11/2020 | Paturi | H04L 63/1416 |
| 2020/0374316 A1* | 11/2020 | Crabtree | H04L 63/1441 |
| 2020/0380138 A1 | 12/2020 | Agarwal | |
| 2020/0396254 A1 | 12/2020 | Crabtree et al. | |
| 2021/0021644 A1* | 1/2021 | Crabtree | G06F 21/577 |
| 2021/0029154 A1* | 1/2021 | Picard | H04L 63/1425 |
| 2021/0092161 A1* | 3/2021 | Crabtree | H04L 63/1433 |
| 2021/0099490 A1* | 4/2021 | Crabtree | H04L 63/1408 |

\* cited by examiner

SYSTEMS AND METHODS FOR AUTOMATED PENETRATION TESTING

CROSS REFERENCE TO RELATED APPLICATIONS

This application is a continuation of and claims priority to U.S. patent application Ser. No. 16/403,818, filed on May 6, 2019, which claims priority to U.S. Provisional Patent Application No. 62/669,770, filed on May 10, 2018, which are incorporated by reference herein in their entirety.

FIELD OF THE INVENTION

The present disclosure relates to automated penetration testing and, more particularly, to a network-based system and method for analyzing computer systems and networks for potential vulnerabilities to cyber-attacks.

BACKGROUND

In penetration testing, multiple computer devices in a computer network are analyzed to determine whether or not any of the computer devices have any vulnerabilities that would allow an external attacker to breach one or more of these computers to access the network. In most cases, the penetration tests are manual and rely on the skill and experience of the tester or team of testers. Furthermore, these tests are performed at specific points in time, such as over a period of seven to ten days. Accordingly, these limitations leave the chance for errors and omissions in the test that may leave potential vulnerabilities undetected.

BRIEF SUMMARY

The present embodiments may relate to systems and methods for analyzing computer systems and networks for potential vulnerabilities to cyber-attacks. The platform may include a penetration testing ("PT") computer system and/or a plurality of user computer devices.

In one aspect, a computer system for analyzing computer systems and networks for potential vulnerabilities to cyber-attacks may be provided. The computer system may include at least one processor in communication with at least one memory device. The at least one processor may be programmed to receive scan data from a scan of a target computer device. The at least one processor may also be programmed to search for one or more vulnerabilities based on the scan data. The at least one processor may further be programmed to determine at least one attack vector based on the one or more vulnerabilities. Moreover, the at least one processor may be programmed to generate one or more exploits based on the one or more attack vectors and the one or more vulnerabilities. In addition, the at least one processor may be programmed to execute the one or more exploits on the target computer device to facilitate rapidly performing penetration testing on a target computer device with up-to-date exploits tailored for the target computer device. The computer system may have additional, less, or alternate functionalities, including those discussed elsewhere herein.

In another aspect, a computer-based method for analyzing computer systems and networks for potential vulnerabilities to cyber-attacks may be provided. The method may be implemented on a penetration testing ("PT") computer device including at least one processor in communication with at least one memory device. The method may include receiving, at the processor, scan data from a scan of a target computer device. The method may also include searching, by the processor, for one or more vulnerabilities based on the scan data. The method may further include determining, by the processor, at least one attack vector based on the one or more vulnerabilities. Moreover, the method may include generating, by the processor, one or more exploits based on the one or more attack vectors and the one or more vulnerabilities. In addition, the method may include executing, by the processor, the one or more exploits on the target computer device to facilitate rapidly performing penetration testing on a target computer device with up-to-date exploits tailored for the target computer device. The method may have additional, less, or alternate functionalities, including those discussed elsewhere herein In yet another aspect, at least one non-transitory computer-readable storage media having computer-executable instructions embodied thereon may be provided. When executed by at least one processor, the computer-executable instructions may cause the processor to receive scan data from a scan of a target computer device. The computer-executable instructions may also cause the processor to search for one or more vulnerabilities based on the scan data. The computer-executable instructions may further cause the processor to determine at least one attack vector based on the one or more vulnerabilities. Moreover, the computer-executable instructions may cause the processor to generate one or more exploits based on the one or more attack vectors and the one or more vulnerabilities. In addition, the computer-executable instructions may cause the processor to execute the one or more exploits on the target computer device to facilitate rapidly performing penetration testing on a target computer device with up-to-date exploits tailored for the target computer device. The computer-readable storage media may have additional, less, or alternate functionalities, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
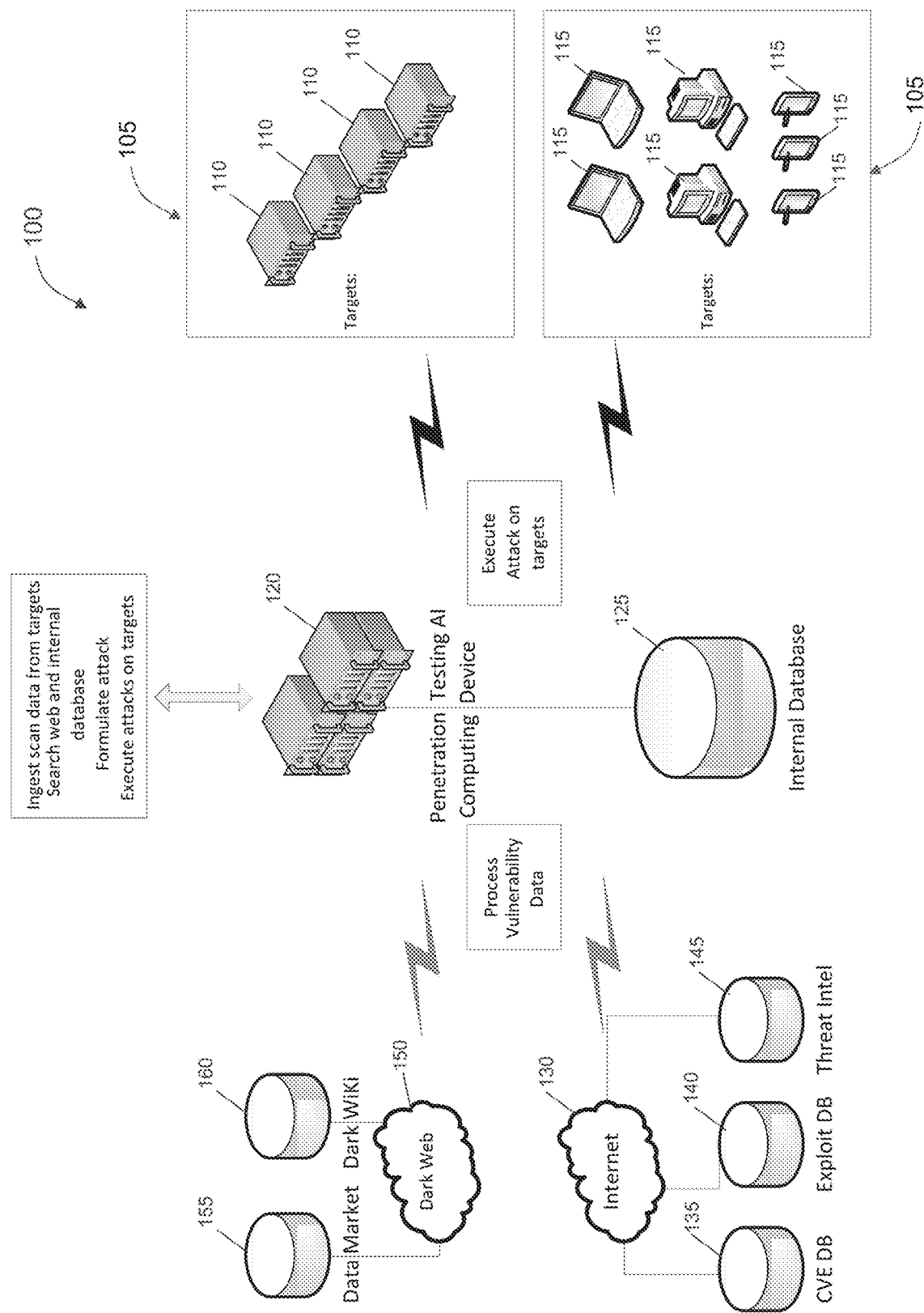
FIG. 1 illustrates a simplified block diagram of an environment for analyzing computer systems and networks for potential vulnerabilities to cyber-attacks.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for analyzing computer systems and networks for potential vulnerabilities to cyber-attacks. In one exemplary embodiment, the methods may be performed by a penetration testing ("PT") computer device, also known as a penetration testing ("PT") server.

In the exemplary embodiment, the PT server may receive scan data from a scan of a target computer device. The PT server may search for one or more vulnerabilities based on the scan data. In some embodiments, the PT server may analyze the scan data to determine one or more services executing on the target computer device. The PT server may first search a local database, such as an internal database, for the one or more vulnerabilities based on the one or more services. In some embodiments, the PT server may search a plurality of websites for the one or more vulnerabilities based on the one or more services. The PT server may update the local database with the one or more vulnerabilities found on the plurality of websites. In some further embodiments, the PT server may search a plurality of blog posts and bulletin board posts for the one or more vulnerabilities. The PT server then generates the one or more exploits based on at least one of the blog posts, the bulletin board posts, the websites, and the local database. The PT server may also update the local database with the one or more exploits based on at least one blog post and bulletin board post.

In the exemplary embodiment, the PT server may determine at least one attack vector based on the one or more vulnerabilities. The PT server may generate one or more exploits based on the one or more attack vectors and the one or more vulnerabilities. In some embodiments, the exploits may be generated specifically for the target computer device based on the services and/or programs running on the target computer device. The PT server is configured to execute the one or more exploits on the target computer device.

In some embodiments, the PT server receives results from the execution of the one or more exploits on the target computer device. The PT server then generates a report based on the results and the one or more vulnerabilities. In some embodiments, the PT server determines at least one fix based on the results and the one or more vulnerabilities. The fix may include a patch or upgrade to be applied to the target computer device. The fix may also include closing a specific port or cancelling a specific service on the target computer device. The PT server may then generate the report based on the results, the one or more vulnerabilities, and the at least one fix. In some further embodiments, the PT server schedules a repair of the target computer device based on the at least one fix, such as by issuing a work order for the fix.

In some embodiments, the PT server is programmed to scan the target computer device on a periodic basis. This periodic basis may be set by the user, such as once every night, e.g. 2 AM, or once a week, e.g. Saturday afternoon. This periodic basis may be randomly determined to test the plurality of target computers at different points in time and under different working conditions.

In the exemplary embodiment, the PT server performs the analysis on each target computer device of the plurality of target computers. In some embodiments, the PT server may search for more vulnerabilities based on the analysis of the plurality of scans rather than performing a search for each scan. In some further embodiments, the PT server may generate a plurality of exploits for the plurality of target computers. In some embodiments, the attack vector may include a plurality of attack vectors for the plurality of target vectors. The PT server may order the attack vectors based on the vulnerabilities and/or the exploits. The PT server may execute the plurality of exploits on the plurality of target computers in a specific order to achieve a specific result.

At least one of the technical solutions to the technical problems provided by this system may include: (i) improving speed and accuracy of penetration testing; (ii) performing penetration testing based on up-to-date research; (iii) automatically determining the latest updates to system exploits and vulnerability research; (iv) providing penetration testing tailored to the specific devices in the network; and (v) providing reports of fixes based on the results of the penetration testing.

The methods and systems described herein may be implemented using computer programming or engineering techniques including computer software, firmware, hardware, or any combination or subset thereof, wherein the technical effects may be achieved by performing at least one of the following steps: (a) scan the target computer device on a periodic basis; (b) receive scan data from a scan of a target computer device; (c) search for one or more vulnerabilities based on the scan data; (d) analyze the scan data to determine one or more services executing on the target computer device; (e) search a local database for the one or more vulnerabilities based on the one or more services; (f) search a plurality of web sites for the one or more vulnerabilities based on the one or more services; (g) search a plurality of blog posts and bulletin board posts for the one or more vulnerabilities; (h) update the local database with the one or more vulnerabilities found on the plurality of websites; (i) update the local database with the one or more vulnerabilities based on at least one of the blog posts and the bulletin board; (j) determine at least one attack vector based on the one or more vulnerabilities; (k) generate one or more exploits based on the one or more attack vectors and the one or more vulnerabilities; (l) generate the one or more exploits based on information provided on websites, blog posts, and/or bulletin board posts; (m) execute the one or more exploits on the target computer device; (n) receive results from the execution of the one or more exploits on the target computer device; (o) determine at least one fix based on the results and the one or more vulnerabilities; (p) generate the report based on the results, one or more vulnerabilities, and the at least one fix; and (q) schedule a repair of the target computer device based on the at least one fix.

The technical effects may be also achieved by performing at least one of the following steps: (a) receive a plurality of scan data from scans of a plurality of target computer devices; (b) perform a search of at least one of a local database and a plurality of web sites for each of the plurality of target computer devices; (c) generate one or more targeted exploits for each of the plurality of target computer devices; and (d) execute the one or more targeted exploits on the corresponding target computer device.

EXEMPLARY PROCESS FOR ANALYZING COMPUTER SYSTEMS AND NETWORKS FOR POTENTIAL VULNERABILITIES

FIG. 1 illustrates a simplified block diagram of an environment 100 for analyzing computer systems and networks for potential vulnerabilities to cyber-attacks. In the exemplary embodiment, a plurality of target computers 105 may be analyzed for potential vulnerabilities to cyberattacks. These target computers 105 may include both server devices 110 and personal computers 115, such as, but not limited to, desktops, laptops, tablets, and smart phones. In the exemplary embodiment, the target computers 105 are analyzed by a penetration testing artificial intelligence computing device 120. The penetration testing artificial intelligence computing device 120 receives scan data from scans of the plurality of target computers 105. Then the penetration testing artificial intelligence computing device 120 searches a local database, such as internal database 125, for potential vulnerabilities and exploits to attack those vulnerabilities. The penetration testing artificial intelligence computing device 120 also searches the web for additional potential vulnerabilities and exploits.

In some embodiments, the penetration testing artificial intelligence computing device 120 searches the Internet 130 for additional potential vulnerabilities and exploits. One series of locations that the penetration testing artificial intelligence computing device 120 may search includes one or more common vulnerability and exposures (CVE) databases 135. The penetration testing artificial intelligence computing device 120 may also search various exploit databases 140. In addition, penetration testing artificial intelligence computing device 120 may search threat intel databases 145.

In some embodiments, the penetration testing artificial intelligence computing device 120 also may search the Dark Web 150 for additional vulnerabilities and exploits. The penetration testing artificial intelligence computing device 120 may search data markets 155 and/or Dark Wikis 160 to discover these additional vulnerabilities and exploits.

Any of these locations may also include forums and/or bulletin boards discussing different issues, vulnerabilities, threats, and exploits that have been discovered. In some embodiments, penetration testing artificial intelligence computing device 120 may perform text-based searching and natural language analysis to determine additional vulnerabilities and exploits.

In the exemplary embodiment, the penetration testing artificial intelligence computing device 120 utilizes the discovered vulnerabilities and exploits to generate an attack plan and then use that attack plan to attack one or more of the plurality of targets 105.

EXEMPLARY METHOD FOR ANALYZING COMPUTER SYSTEMS

Figure 2:
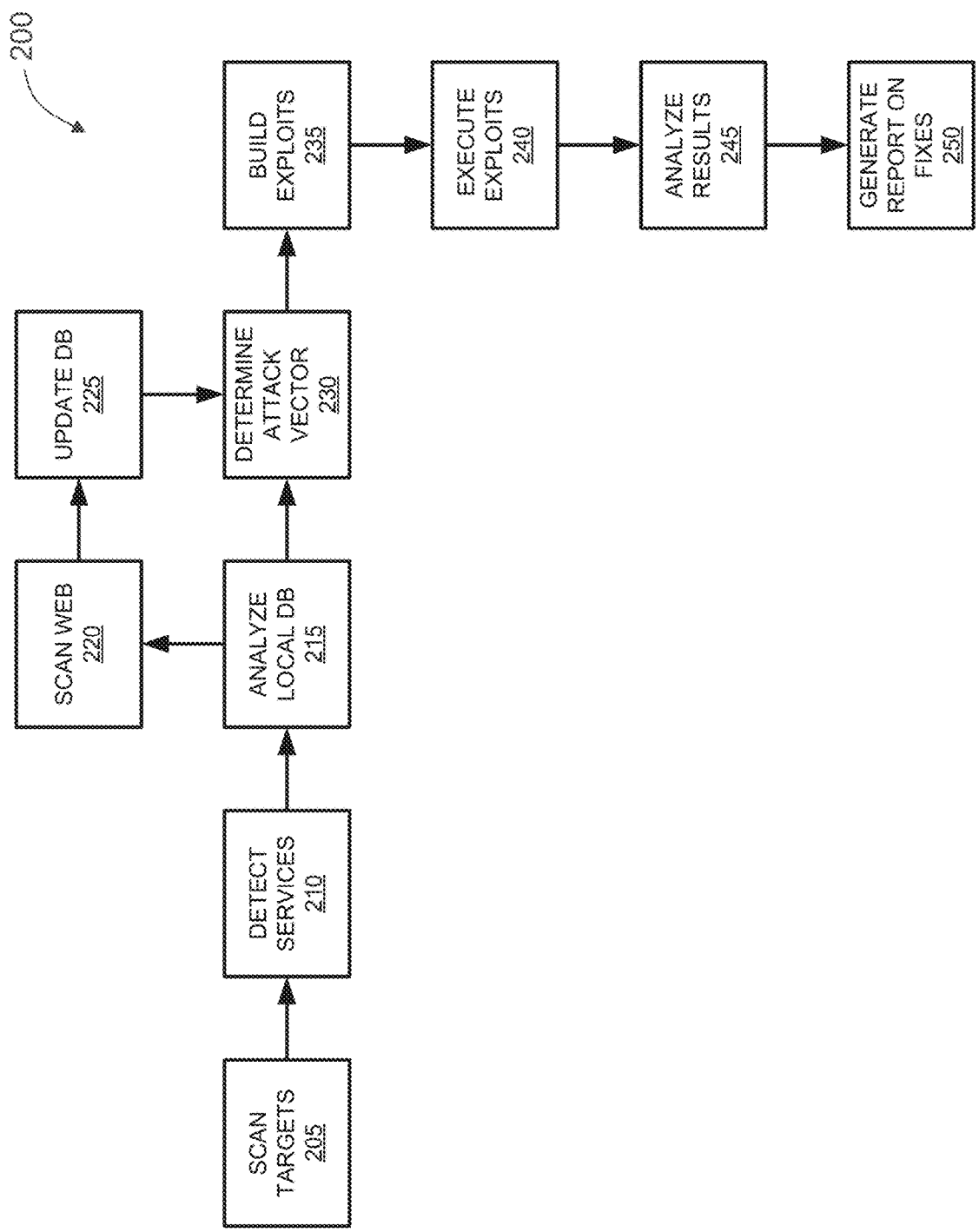
FIG. 2 illustrates a flow chart of an exemplary process of analyzing computer systems and networks for potential vulnerabilities to cyber-attacks.

FIG. 2 illustrates a flow chart of an exemplary process 200 of analyzing computer systems and networks for potential vulnerabilities to cyber-attacks. Process 200 may be implemented by a computing device, for example penetration testing artificial intelligence computing device 120 (shown in FIG. 1).

In the exemplary embodiment, penetration testing artificial intelligence computing device 120 may scan 205 the plurality of target computers 105 (shown in FIG. 1). In other embodiments, penetration testing artificial intelligence computing device 120 receives the results of scans of the plurality of target computers 105 from other computer devices that have performed the scans. The scans may include data, such as computer addresses, software versions, and port statuses for each of the plurality of target computers 105.

From the scan data, the penetration testing artificial intelligence computing device 120 detects 210 the services running on each of the plurality of target computers 105. In the exemplary embodiment, the penetration testing artificial intelligence computing device 120 analyzes 215 the internal database 125 (shown in FIG. 1) of exploits and vulnerabilities. The penetration testing artificial intelligence computing device 120 compares the services running on the target computer 105 to those that vulnerabilities are known to exist for. For example, the penetration testing artificial intelligence computing device 120 may determine that a target computer 105 is running an older version of Apache that has a known vulnerability. The penetration testing artificial intelligence computing device 120 will then use that known vulnerability to determine 230 an attack vector to attack that target computer 105.

In some embodiments, the penetration testing artificial intelligence computing device 120 will also scan 220 the web for vulnerabilities. The penetration testing artificial intelligence computing device 120 may scan both the Internet 130 and the Dark Web 150 (both shown in FIG. 1). If the penetration testing artificial intelligence computing device 120 discovers a new vulnerability, the penetration testing artificial intelligence computing device 120 will update 225 the database 125 with the new vulnerability. The penetration testing artificial intelligence computing device 120 may use that new vulnerability to determine 230 the attack vector for the target computer 105.

In the exemplary embodiment, the penetration testing artificial intelligence computing device 120 will build 235 exploits to take advantage of the vulnerabilities discovered by analyzing 215 the local database 125 and scanning 220 the web. The penetration testing artificial intelligence computing device 120 may tailor the exploits to exactly match the target computer 105. For example, the penetration testing artificial intelligence computing device 120 may use multiple vulnerabilities in combination, potentially using vulnerabilities in multiple services on the target computer 105, to build 235 the exploit.

The penetration testing artificial intelligence computing device 120 may execute 240 the exploits on the target computer 105 test the security of the target computer 105. The penetration testing artificial intelligence computing device 120 receives results from the execution. In some cases, the results may show that the exploit was able to breach the target computer 105. In other cases, the exploit may not breach the target computer 105. The penetration testing artificial intelligence computing device 120 analyzes 245 the results of the execution of the exploit. In some embodiments, the penetration testing artificial intelligence computing device 120 stores the results in the internal database 125 for use in making exploits in the future. Based on the results, the penetration testing artificial intelligence computing device 120 may determine one or more fixes to repair the issues detected. For example, the penetration testing artificial intelligence computing device 120 may determine that the version of Apache on the target computer 105 needs to be upgraded or patched to the latest version. The penetration testing artificial intelligence computing device 120 generates 250 a report based on the results of the execution of the exploits and the fixes. In the exemplary embodiment, the penetration testing artificial intelligence computing device 120 runs through process 200 for each of the plurality of target computers 105. In some embodiments, the penetration testing artificial intelligence computer device 120 may determine 230 the attack vectors for multiple machines and/or attack vectors that may affect multiple machines simultaneously.

EXEMPLARY COMPUTER-IMPLEMENTED METHOD FOR ANALYZING COMPUTER SYSTEMS

Figure 3:
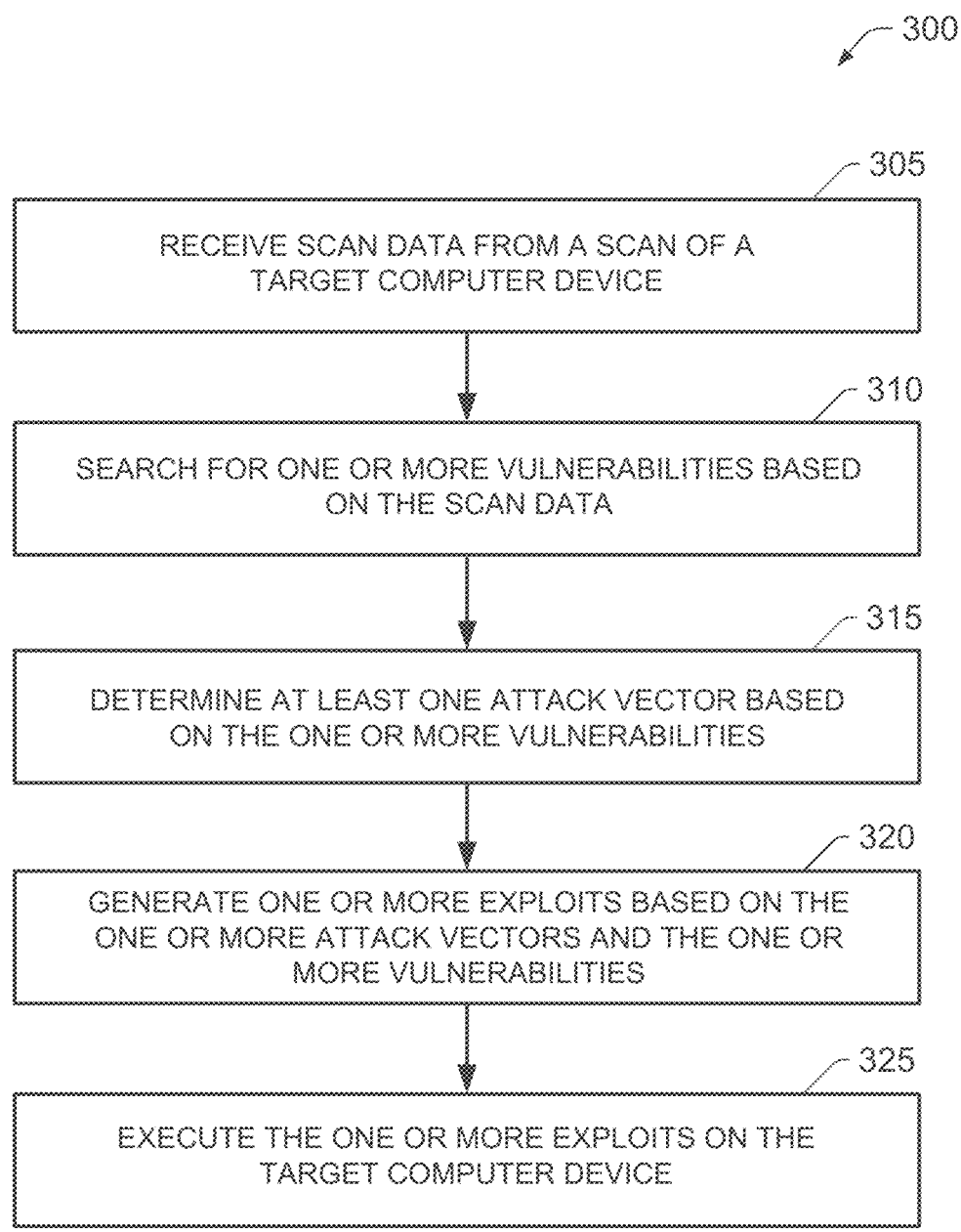
FIG. 3 illustrates a flow chart of an exemplary computer-implemented process for analyzing computer systems and networks for potential vulnerabilities to cyber-attacks as shown in FIG. 2 based on the environment in FIG. 1.

FIG. 3 illustrates a flow chart of an exemplary computer-implemented process 300 for analyzing computer systems and networks for potential vulnerabilities to cyber-attacks based on the process 200 (shown in FIG. 2) and the environment 100 (shown in FIG. 1. Process 300 may be implemented by a computing device, for example penetration testing artificial intelligence computing device 120 (shown in FIG. 1) or PT server 410 (shown in FIG. 4). In the exemplary embodiment, PT server 410 may be able to communicate with at least one target computer 105 (shown in FIG. 1) or target computer device 405 (shown in FIG. 4).

In the exemplary embodiment, PT server 410 may receive 305 scan data from a scan of a target computer device 405. PT server 410 may search 310 for one or more vulnerabilities based on the scan data. In some embodiments, PT server 410 may analyze the scan data to determine one or more services executing on the target computer device 405. PT server 410 may first search a local database, such as internal database 125 (shown in FIG. 1), for the one or more vulnerabilities based on the one or more services. In some embodiments, PT server 410 searches a plurality of websites for the one or more vulnerabilities based on the one or more services. PT server 410 may update the internal database 125 with the one or more vulnerabilities found on the plurality of websites. In some further embodiments, PT server 410 may search a plurality of blog posts and bulletin board posts for the one or more vulnerabilities. PT server 410 then generates the one or more exploits based on information from at least one of the database, the websites, the blog posts, and the bulletin board posts. PT server 410 may also update the internal database 125 with the one or more exploits based on the at least one blog post and/or bulletin board.

In the exemplary embodiment, PT server 410 may determine 315 at least one attack vector based on the one or more vulnerabilities. PT server 410 may generate 320 one or more exploits based on the one or more attack vectors and the one or more vulnerabilities. In some embodiments, the exploits may be generated 320 specifically for the target computer device 405 based on the services and/or programs running on the target computer device 405. PT server 410 executes 325 the one or more exploits on the target computer device 405.

In some embodiments, PT server 410 receives results from the execution of the one or more exploits on the target computer device 405. PT server 410 then generates a report based on the results and the one or more vulnerabilities. In some embodiments, PT server 410 determines at least one fix based on the results and the one or more vulnerabilities. The fix may include a patch or upgrade to be applied to the target computer device 405. The fix may also include closing a specific port or cancelling a specific service on the target computer device 405. PT server 410 may then generate the report based on the results, one or more vulnerabilities, and the at least one fix. In some further embodiments, PT server 410 schedules a repair of the target computer device 405 based on the at least one fix, such as by issuing a work order for the fix.

In some embodiments, PT server 410 is programmed to scan the target computer device 405 on a periodic basis. This periodic basis may be set by the user, such as once every night, e.g. 2 AM, or once a week, e.g. Saturday afternoon. This periodic basis may be randomly determined to test the plurality of target computers 105 at different points in time and under different working conditions.

In the exemplary embodiment, PT server 410 performs the steps of process 300 on each target computer device 405 of the plurality of target computers 105. In some embodiments, PT server 410 may search 310 for more vulnerabilities based on the analysis of the plurality of scans rather than performing a search 310 for each scan. In some further embodiments, PT server 410 may generate a plurality of exploits for the plurality of target computers 105. In some embodiments, the attack vector may include a plurality of attack vectors for the plurality of target vectors. PT server 410 may order the attack vectors based on the vulnerabilities and/or the exploits. PT server 410 may execute the plurality of exploits on the plurality of target computers 105 in a specific order to achieve a specific result.

EXEMPLARY COMPUTER NETWORK

Figure 4:
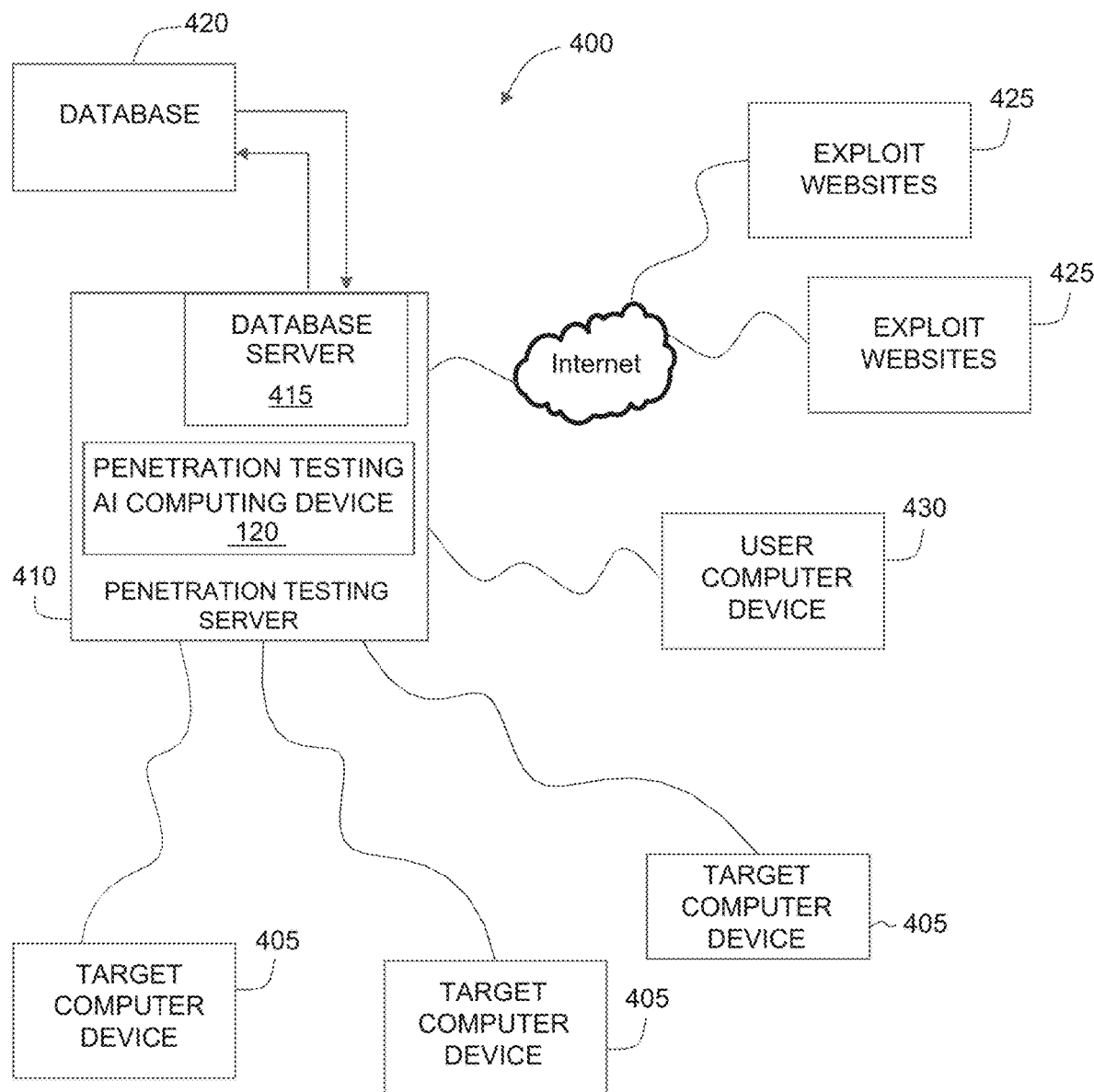
FIG. 4 illustrates a simplified block diagram of an exemplary computer system for implementing the processes shown in FIGS. 2 and 3.

FIG. 4 illustrates a simplified block diagram of an exemplary system 400 for implementing the process 200 (shown in FIG. 2) and the process 300 (shown in FIG. 3). In the exemplary embodiment, system 400 may be used for analyzing computer systems and networks for potential vulnerabilities to cyber-attacks. As described below in more detail, a penetration testing ("PT") computer system, also known as penetration testing ("PT") server 410, may be configured to (i) receive scan data from a scan of a target computer device 405; (ii) search for one or more vulnerabilities based on the scan data; (iii) determine at least one attack vector based on the one or more vulnerabilities; (iv) generate one or more exploits based on the one or more attack vectors and the one or more vulnerabilities; and (v) execute the one or more exploits on the target computer device 405.

In the exemplary embodiment, user computer devices 430 may be computers that include a web browser or a software application, which enables user computer devices 430 to access remote computer devices, such as PT server 410, using the Internet or other network. More specifically, user computer devices 430 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 430 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 415 may be communicatively coupled to a database 420 that stores data. In one embodiment, database 420 may include scan data, vulnerabilities, exploits, and fixes. In some embodiments, database 420 may be similar to internal database 125. In the exemplary embodiment, database 420 may be stored remotely from PT server 410. In some embodiments, database 420 may be decentralized. In the exemplary embodiment, a user may access database 420 via user computer device 430 by logging onto PT server 410, as described herein.

PT server 410 may be in communication with a plurality of user computer devices 430 to receive commands to analyze target computer device 405 and to transmit reports to at least one of the plurality of user computer devices 430. In some embodiments, PT server 410 may host or include artificial intelligence functionality, such as penetration testing artificial intelligence computing device 120, where the penetration testing artificial intelligence computer device 120 performs the steps of either process 200 and/or process 300. In some embodiments, PT server 410 may be a plurality of computer devices working in concert to perform the steps outlined herein.

In the exemplary embodiment, exploit websites 425 are websites that describe potential vulnerabilities in computer systems and computer software. These websites 425 may be databases, bulletin boards, forums, marketplaces, or other types of websites that may explain discovered vulnerabilities and potential exploits to attack those vulnerabilities. Exploit websites 425 may include, but are not limited to, CVE databases 135, exploit databases 140, threat intel databases 145, data markets 155 and/or Dark Wikis 160 (all shown in FIG. 1).

EXEMPLARY CLIENT DEVICE

Figure 5:
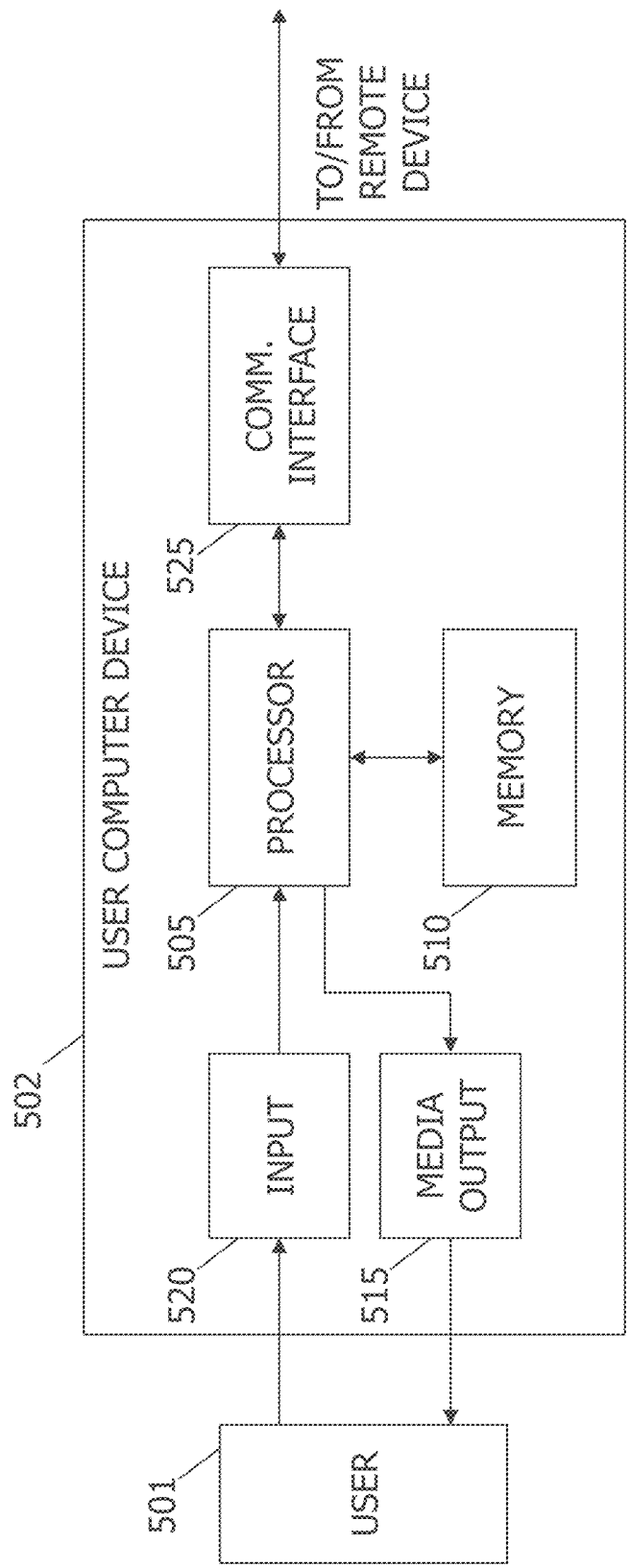
FIG. 5 illustrates an exemplary configuration of a client computer device, in accordance with one embodiment of the present disclosure.

FIG. 5 depicts an exemplary configuration of a client computer device, in accordance with one embodiment of the present disclosure. User computer device 502 may be operated by a user 501. User computer device 502 may include, but is not limited to, target computers 105, personal computers 115 (both shown in FIG. 1), target computer devices 405, and user computer devices 430 (both shown in FIG. 4). User computer device 502 may include a processor 505 for executing instructions. In some embodiments, executable instructions may be stored in a memory area 510. Processor 505 may include one or more processing units (e.g., in a multi-core configuration). Memory area 510 may be any device allowing information such as executable instructions and/or transaction data to be stored and retrieved. Memory area 510 may include one or more computer readable media.

User computer device 502 may also include at least one media output component 515 for presenting information to user 501. Media output component 515 may be any component capable of conveying information to user 501. In some embodiments, media output component 515 may include an output adapter (not shown) such as a video adapter and/or an audio adapter. An output adapter may be operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 515 may be configured to present a graphical user interface (e.g., a web browser and/or a client application) to user 501. A graphical user interface may include, for example, an interface for viewing reports on the results of executed exploits.

In some embodiments, user computer device 502 may include an input device 520 for receiving input from user 501. User 501 may use input device 520 to, without limitation, select a target computer 105 to analyze.

Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote device such as PT server 410 (shown in FIG. 4). Communication interface 525 may include, for example, a wired or wireless network adapter and/or a wireless data transceiver for use with a mobile telecommunications network.

Stored in memory area 510 are, for example, computer readable instructions for providing a user interface to user 501 via media output component 515 and, optionally, receiving and processing input from input device 520. A user interface may include, among other possibilities, a web browser and/or a client application. Web browsers enable users, such as user 501, to display and interact with media and other information typically embedded on a web page or a website from PT server 410. A client application may allow user 501 to interact with, for example, PT server 410. For example, instructions may be stored by a cloud service, and the output of the execution of the instructions sent to the media output component 515.

EXEMPLARY SERVER DEVICE

Figure 6:
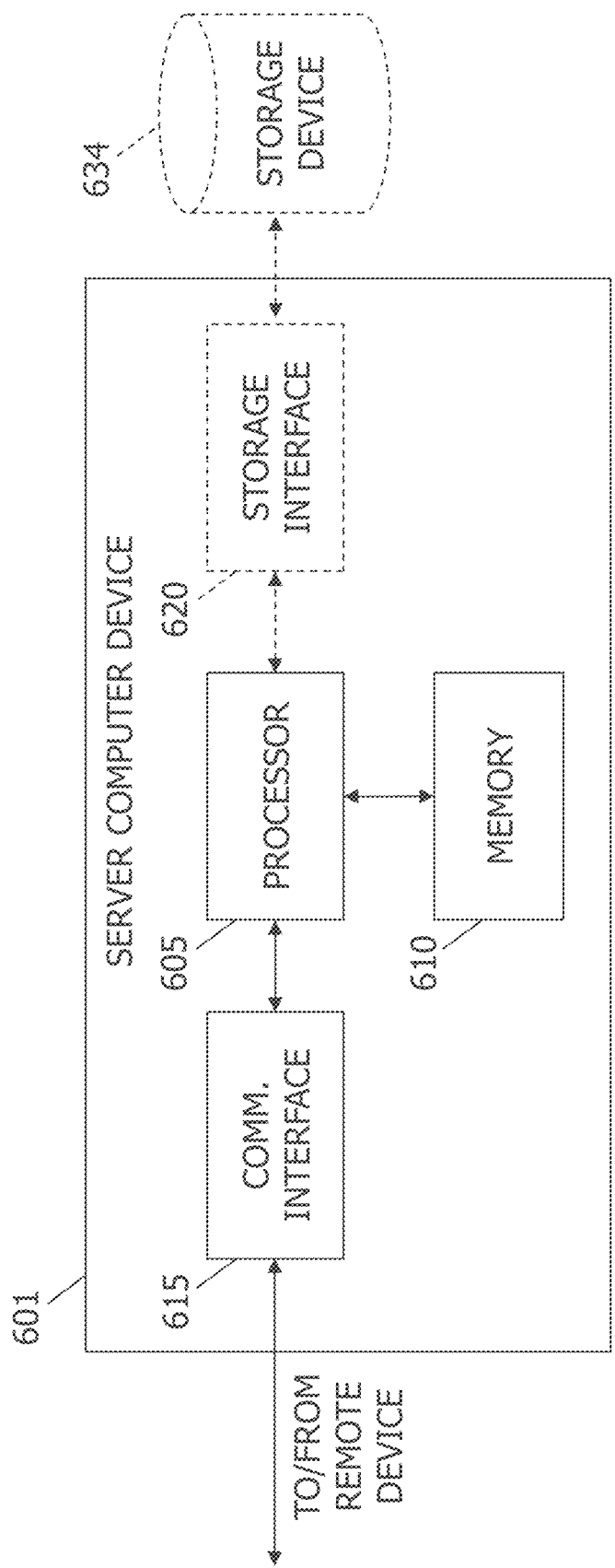
FIG. 6 illustrates an exemplary configuration of a server system, in accordance with one embodiment of the present disclosure.

FIG. 6 depicts an exemplary configuration of a server system, in accordance with one embodiment of the present disclosure. Server computer device 601 may include, but is not limited to, penetration testing artificial intelligence computing device 120, server device 110 (both shown in FIG. 1), PT server 410, and database server 415 (both shown in FIG. 4). Server computer device 601 may also include a processor 605 for executing instructions. Instructions may be stored in a memory area 610. Processor 605 may include one or more processing units (e.g., in a multi-core configuration).

Processor 605 may be operatively coupled to a communication interface 615 such that server computer device 601 is capable of communicating with a remote device such as another server computer device 601, PT server 410, target computer device 405, exploit websites 425, and user computer devices 430 (shown in FIG. 4) (e.g. using wireless communication or data transmission over one or more radio links or digital communication channels). For example, communication interface 615 may receive requests from user computer devices 430 via the Internet, as illustrated in FIG. 4.

Processor 605 may also be operatively coupled to a storage device 634. Storage device 634 may be any computer-operated hardware suitable for storing and/or retrieving data, such as, but not limited to, data associated with database 420 (shown in FIG. 4). In some embodiments, storage device 634 may be integrated in server computer device 601. For example, server computer device 601 may include one or more hard disk drives as storage device 634.

In other embodiments, storage device 634 may be external to server computer device 601 and may be accessed by a plurality of server computer devices 601. For example, storage device 634 may include a storage area network (SAN), a network attached storage (NAS) system, and/or multiple storage units such as hard disks and/or solid state disks in a redundant array of inexpensive disks (RAID) configuration.

In some embodiments, processor 605 may be operatively coupled to storage device 634 via a storage interface 620. Storage interface 620 may be any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 may execute computer-executable instructions for implementing aspects of the disclosure. In some embodiments, the processor 605 may be transformed into a special purpose microprocessor by executing computer-executable instructions or by otherwise being programmed. For example, the processor 605 may be programmed with the instruction such as illustrated in FIGS. 2 and 3.

EXEMPLARY COMPUTER DEVICE

Figure 7:
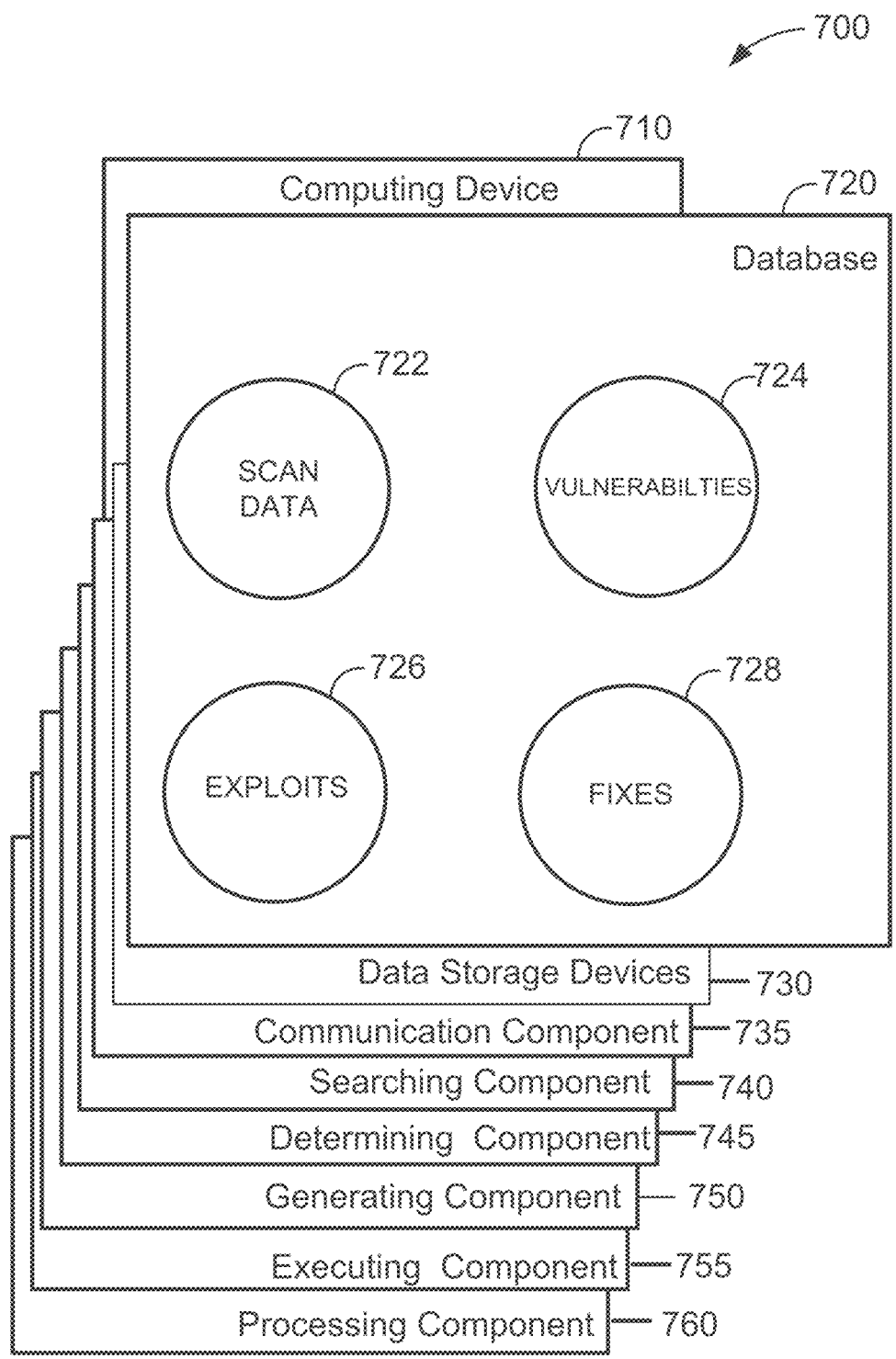
FIG. 7 illustrates a diagram of components of one or more exemplary computing devices that may be used in the process shown in FIGS. 2 and 3 and the system shown in FIG. 4.

FIG. 7 depicts a diagram 700 of components of one or more exemplary computing devices 710 that may be used to implement process 200 (shown in FIG. 2) and process 300 (shown in FIG. 3). In some embodiments, computing device 710 may be similar to PT server 410 (shown in FIG. 4) and/or penetration testing artificial intelligence computing device 120 (shown in FIG. 1). Database 720 may be coupled with several separate components within computing device 710, which perform specific tasks. In this embodiment, database 720 may include scan data 722, vulnerabilities 724, exploits 726, and fixes 728. In some embodiments, database 720 is similar to database 420 (shown in FIG. 4).

Computing device 710 may include the database 720, as well as data storage devices 730. Computing device 710 may also include a communication component 735 for receiving 305 scan data (shown in FIG. 3). Computing device 710 may further include a searching component 740 for searching 310 for one or more vulnerabilities (shown in FIG. 3). Moreover, computing device 710 may include a determining component 745 for determining 315 at least one attack vector (shown in FIG. 3). In addition, computing device 710 may include a generating component 750 for generating 320 one or more exploits (shown in FIG. 3). Computing device 710 may also include an executing component 755 for executing 325 the one or more exploits (shown in FIG. 3). A processing component 760 may assist with execution of computer-executable instructions associated with the system.

EXEMPLARY EMBODIMENTS & FUNCTIONALITY

In one aspect, a computer system for analyzing computer systems and networks for potential vulnerabilities to cyber-attacks may be provided. The computer system may include at least one processor in communication with at least one memory device. The at least one processor may be programmed to: (i) receive scan data from a scan of a target computer device; (ii) search for one or more vulnerabilities based on the scan data; (iii) determine at least one attack vector based on the one or more vulnerabilities; (iv) generate one or more exploits based on the one or more attack vectors and the one or more vulnerabilities; and (v) execute the one or more exploits on the target computer device. The system may include additional, less, or alternate functionalities, including that discussed elsewhere herein.

In another aspect, a computer-based method for analyzing computer systems and networks for potential vulnerabilities to cyber-attacks may be provided. The method may be implemented on a penetration testing ("PT") computer device including at least one processor in communication with at least one memory device. The method may include: (1) receiving, at the processor, scan data from a scan of a target computer device; (2) searching, by the processor, for one or more vulnerabilities based on the scan data; (3) determining, by the processor, at least one attack vector based on the one or more vulnerabilities; (4) generating, by the processor, one or more exploits based on the one or more attack vectors and the one or more vulnerabilities; and (5) executing, by the processor, the one or more exploits on the target computer device. The method may include additional, less, or alternate functionality, including that discussed elsewhere herein.

In still another aspect, at least one non-transitory computer-readable storage media having computer-executable instructions embodied thereon is provided. When executed by at least one processor, the computer-executable instructions may cause the processor to: (1) receive scan data from a scan of a target computer device; (2) search for one or more vulnerabilities based on the scan data; (3) determine at least one attack vector based on the one or more vulnerabilities; (4) generate one or more exploits based on the one or more attack vectors and the one or more vulnerabilities; and (5) execute the one or more exploits on the target computer device. The storage media may include additional, less, or alternate functionality, including that discussed elsewhere herein.

MACHINE LEARNING & OTHER MATTERS

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, report data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, the computer network hosting the computer device, services executing on the computer device, and/or other data.

Based upon these analyses, the processing element may learn how to identify characteristics and patterns that may then be applied to training models, analyzing sensor data, generating exploits, and/or identifying vulnerabilities, authentication data, image data, mobile device data, and/or other data.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom), or any other type of operating system environment. The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A penetration testing ("PT") computer system for analyzing other computer systems and networks for potential vulnerabilities to cyber-attacks, the PT computer system including at least one processor in communication with at least one memory device, the at least one processor programmed to:
   receive scan data from a scan of a target computer device;
   determine a plurality of vulnerabilities of the target computer device based on the scan data;
   scan one or more exploit websites to detect a potential exploit based on the one or more of the plurality of vulnerabilities;
   generate a first exploit based on the plurality of vulnerabilities and the potential exploit, wherein the first exploit is tailored to attack the target computer device based on the plurality of vulnerabilities; and
   execute the first exploit on the target computer device.

2. The PT computer system in accordance with claim 1, wherein the at least one processor is further programmed to:
   identify a plurality of attack vectors based on the scan data;
   scan one or more exploit websites to detect a potential exploit based on the one or more of the plurality of attack vectors; and
   generate the first exploit based on the plurality of attack vectors, the potential exploit, and the plurality of vulnerabilities, wherein the first exploit is tailored to attack the target computer device based on the plurality of vulnerabilities and the plurality of attack vectors.

3. The PT computer system in accordance with claim 2, wherein the at least one processor is further programmed to:
   receive results from the execution of the first exploit on the target computer device; and
   generate a report based on the results and the plurality of attack vectors.

4. The PT computer system in accordance with claim 3, wherein the at least one processor is further programmed to:
   determine at least one fix based on the results and the plurality of attack vectors; and
   generate the report based on the results, the plurality of attack vectors, and the at least one fix.

5. The PT computer system in accordance with claim 4, wherein the at least one processor is further programmed to schedule a repair of the target computer device based on the at least one fix.

6. The PT computer system in accordance with claim 1, wherein the at least one processor is further programmed to:
   analyze the scan data to determine one or more services executing on the target computer device; and
   search a local database for the plurality of vulnerabilities based on the one or more services.

7. The PT computer system in accordance with claim 6, wherein the at least one processor is further programmed to search a plurality of websites for the plurality of vulnerabilities based on the one or more services.

8. The PT computer system in accordance with claim 7, wherein the at least one processor is further programmed to search a plurality of blog posts and bulletin board posts for the plurality of vulnerabilities.

9. The PT computer system in accordance with claim 8, wherein the at least one processor is further programmed to generate the first exploit based on the search of at least one of the local database, the websites, the blog posts, and the bulletin board posts.

10. The PT computer system in accordance with claim 9, wherein the at least one processor is further programmed to:
    update the local database with the plurality of vulnerabilities found on the plurality of websites; and
    update the local database with the first exploit based on at least one of the blog posts and the bulletin board posts.

11. The PT computer system in accordance with claim 1, wherein the at least one processor is further programmed to scan the target computer device on a periodic basis.

12. The PT computer system in accordance with claim 1, wherein the at least one processor is further programmed to:
    receive a plurality of scan data from scans of a plurality of target computer devices;
    perform a search of at least one of a local database and a plurality of websites for each of the plurality of target computer devices;
    generate one or more targeted exploits for each of the plurality of target computer devices; and
    execute the one or more targeted exploits on the corresponding target computer device.

13. A computer-based method for analyzing computer systems and networks for potential vulnerabilities to cyber-attacks, the method implemented on a penetration testing ("PT") computer device including at least one processor in communication with at least one memory device, the method comprising:
    receiving, at the processor, scan data from a scan of a target computer device;
    determining, by the processor, a plurality of vulnerabilities of the target computer device based on the-scan data;
    scanning, by the processor, one or more exploit websites to detect a potential exploit based on the plurality of vulnerabilities;
    generating, by the processor, a first exploit based on the plurality of attack vectors and the potential exploit, wherein the first exploit is tailored to attack the target computer device based on the plurality of vulnerabilities; and
    executing, by the processor, the first exploit on the target computer device.

14. The method of claim 13 further comprising:
    analyzing the scan data to determine one or more services executing on the target computer device; and
    searching a local database for the plurality of vulnerabilities based on the one or more services.

15. The method of claim 14 further comprising searching a plurality of websites for the plurality of vulnerabilities based on the one or more services.

16. The method of claim 15 further comprising searching a plurality of blog posts and bulletin board posts for the plurality of vulnerabilities.

17. The method of claim 16 further comprising:
    updating the local database with the plurality of vulnerabilities found on the plurality of websites; and
    updating the local database with the first exploit based on at least one of the blog posts and the bulletin board posts.

18. The method of claim 17 further comprising:
    receiving a plurality of scan data from scans of a plurality of target computer devices;
    performing a search of at least one of a local database and a plurality of websites for each of the plurality of target computer devices;
    generating one or more targeted exploits for each of the plurality of target computer devices; and
    executing the one or more targeted exploits on the corresponding target computer device.

19. At least one non-transitory computer-readable storage media having computer-executable instructions embodied thereon, wherein when executed by at least one processor, the computer-executable instructions cause the processor to:
- receive scan data from a scan of a target computer device;
- determine a plurality of vulnerabilities of the target computer device based on the scan data;
- scan one or more exploit websites to detect a potential exploit based on the one or more of the plurality of vulnerabilities;
- generate a first exploit based on the plurality of attack vectors and the potential exploit, wherein the first exploit is tailored to attack the target computer device based on the plurality of attack vectors and the plurality of vulnerabilities; and
- execute the first exploit on the target computer device.

20. The computer-readable storage media of claim 19, wherein the computer-executable instructions further cause the processor to:
- receive a plurality of scan data from scans of a plurality of target computer devices;
- perform a search of at least one of a local database and a plurality of websites for each of the plurality of target computer devices;
- generate one or more targeted exploits for each of the plurality of target computer devices; and
- execute the one or more targeted exploits on the corresponding target computer device.

* * * * *